(12) United States Patent
Künz

(10) Patent No.: US 12,064,915 B2
(45) Date of Patent: Aug. 20, 2024

(54) BLOW MOLDING TOOL FOR A BLOW MOLDING MACHINE

(71) Applicant: ALPLA Werke Alwin Lehner GmbH & Co. KG, Hard (AT)

(72) Inventor: Johann Künz, Hard (AT)

(73) Assignee: ALPLA Werke Alwin Lehner GmbH & Co. KG, Hard (AT)

(*) Notice: Subject to any disclaimer, the term of this patent is extended or adjusted under 35 U.S.C. 154(b) by 157 days.

(21) Appl. No.: 17/599,760

(22) PCT Filed: Mar. 27, 2020

(86) PCT No.: PCT/EP2020/058664
§ 371 (c)(1),
(2) Date: Sep. 29, 2021

(87) PCT Pub. No.: WO2020/201061
PCT Pub. Date: Oct. 8, 2020

(65) Prior Publication Data
US 2022/0152909 A1 May 19, 2022

(30) Foreign Application Priority Data
Mar. 29, 2019 (CH) .................................. 00413/19

(51) Int. Cl.
*B29C 49/48* (2006.01)
*B29C 49/30* (2006.01)
(Continued)

(52) U.S. Cl.
CPC .......... *B29C 49/4823* (2013.01); *B29C 49/30* (2013.01); *B29C 49/64* (2013.01);
(Continued)

(58) Field of Classification Search
CPC ........ B29C 49/4823; B29C 2049/4825; B29C 2049/483; B29C 2049/4876
(Continued)

(56) References Cited

U.S. PATENT DOCUMENTS

| 4,206,171 A | 6/1980 | Uhlig |
| 5,041,247 A * | 8/1991 | Kim ........................ B29C 33/56 |
| | | 425/526 |

(Continued)

FOREIGN PATENT DOCUMENTS

| CN | 1148827 A | 4/1997 |
| CN | 107257726 A | 10/2017 |

(Continued)

OTHER PUBLICATIONS

Mechanical translation of Buchner et al.(DE 3301337 A1) dated Jul. 1984. (Year: 1984).*
(Continued)

*Primary Examiner* — Robert B Davis
(74) *Attorney, Agent, or Firm* — Finch & Maloney PLLC

(57) ABSTRACT

The invention relates to a blow molding tool for a blow molding machine for producing plastic containers in an extrusion or stretch blow-molding process. The blow molding tool comprises two blow mold halves, each of which comprises at least one molding body in which at least one mold cavity is disposed, and a baseplate that receives said molding body. An insulation block consisting of a thermally insulating material is arranged between the molding body and the baseplate and, optionally, further components of the blow mold halves.

27 Claims, 2 Drawing Sheets

(51) Int. Cl.
  *B29C 49/64* (2006.01)
  *B29C 49/04* (2006.01)
  *B29K 23/00* (2006.01)
  *B29L 31/00* (2006.01)

(52) U.S. Cl.
  CPC ...... *B29C 49/04* (2013.01); *B29C 2049/4825* (2013.01); *B29C 2049/483* (2013.01); *B29C 2049/4838* (2013.01); *B29C 2049/4846* (2013.01); *B29C 2049/4851* (2013.01); *B29C 2049/4876* (2013.01); *B29C 2049/4879* (2013.01); *B29K 2023/00* (2013.01); *B29K 2023/12* (2013.01); *B29K 2871/00* (2013.01); *B29K 2905/02* (2013.01); *B29K 2905/12* (2013.01); *B29K 2995/0015* (2013.01); *B29K 2995/003* (2013.01); *B29L 2031/712* (2013.01); *B29L 2031/7158* (2013.01)

(58) Field of Classification Search
  USPC ........................................................ 249/111
  See application file for complete search history.

(56) References Cited

U.S. PATENT DOCUMENTS

| | | | |
|---|---|---|---|
| 7,758,801 B2 | 7/2010 | Künz | |
| 9,296,147 B2 | 3/2016 | Le Pechour et al. | |
| 2006/0051451 A1 | 3/2006 | Hutchinson et al. | |
| 2010/0252963 A1 | 10/2010 | Scharf et al. | |
| 2011/0298162 A1 | 12/2011 | Chomel et al. | |
| 2014/0053609 A1 | 2/2014 | Bennett | |
| 2015/0151480 A1* | 6/2015 | Brunner | B29C 49/46 425/526 |
| 2016/0375624 A1* | 12/2016 | Culeron | B29B 7/002 264/403 |
| 2018/0079128 A1 | 3/2018 | Rapet et al. | |
| 2018/0162037 A1 | 6/2018 | Chomel | |
| 2022/0152910 A1 | 5/2022 | Künz et al. | |

FOREIGN PATENT DOCUMENTS

| | | | | |
|---|---|---|---|---|
| DE | 3301337 A1 | * | 7/1984 | |
| DE | 102010020090 A1 | * | 11/2011 | ............ B29C 33/04 |
| EP | 2 208 606 A2 | | 7/2010 | |
| EP | 2 703 146 A1 | | 3/2014 | |
| FR | 2 982 789 A1 | | 5/2013 | |
| GB | 1 480 647 | | 7/1977 | |
| GB | 2239626 A | * | 7/1991 | ............ B29C 33/04 |
| JP | H07-40426 A | | 2/1995 | |
| JP | 07108534 A | * | 4/1995 | ........ B29C 49/4823 |
| JP | 07214568 A | * | 8/1995 | ........ B29C 49/4823 |
| WO | 96/30190 A1 | | 10/1996 | |
| WO | WO-9933634 A1 | * | 7/1999 | ........... B29C 35/007 |
| WO | 00/27612 A1 | | 5/2000 | |
| WO | 2006/000329 A1 | | 1/2006 | |
| WO | 2017/005561 A1 | | 1/2017 | |

OTHER PUBLICATIONS

Mechanical translation of Shoji et al.(JP 07-214568 A) dated Aug. 1995. (Year: 1995).*
Mechanical translation of Uchida et al (JP H07-108534 A) dated Apr. 1995. (Year: 1995).*
Machine translation of Furuki et al (WO-9933634 A1) dated Jul. 1999. (Year: 1999).*
International Search Report Corresponding to PCT/EP2020/058664 mailed Jun. 5, 2020 (Previosly Submitted).
Written Opinion Corresponding to PCT/EP2020/058664 mailed Jun. 5, 2020 (Previously Submitted).
International Search Report Corresponding to PCT/EP2020/058665 mailed Jun. 8, 2020.
Written Opinion Corresponding to PCT/EP2020/058665 mailed Jun. 8, 2020.
International Search Report Corresponding to PCT/EP2020/058666 mailed Jun. 9, 2020.
Written Opinion Corresponding to PCT/EP2020/058666 mailed Jun. 9, 2020.
Indian Office Action Corresponding to 202117041378 mailed Sep. 1, 2023.
Indian Office Action Corresponding to 202117041364 mailed Jul. 7, 2023.
Chinese Office Action Corresponding to 2020800251643 mailed Jul. 20, 2023
Chinese Office Action Corresponding to 202080025161X mailed Aug. 7, 2023
Chinese Office Action Corresponding to 202080025162.4 mailed Aug. 5, 2023.

\* cited by examiner

BLOW MOLDING TOOL FOR A BLOW MOLDING MACHINE

This application is a National Stage completion of PCT/EP2020/058664 filed Mar. 27, 2020, which claims priority from Swiss patent application serial no. 00413/19 filed Mar. 29, 2019.

FIELD OF THE INVENTION

The invention relates to a blow molding tool for a blow molding machine for producing plastic containers in an extrusion or stretch blow-molding process.

BACKGROUND OF THE INVENTION

The containers made of white or non-ferrous metal, of glass or also of ceramic, which were customary in the past, are being increasingly replaced by containers made of plastic. Plastic containers have now come to be mainly used for packaging fluid substances, for example beverages, household products, personal care products, cosmetics, etc. The low weight and lower costs certainly play a significant role in this substitution. The use of recyclable plastic materials and the overall more favorable total energy balance during their production also contribute to advancing the acceptance of plastic containers, in particular plastic bottles, by the consumer.

Single-layer or multilayer plastic containers, for example made of polyolefins, are often produced in an extrusion blow-molding method, in particular in a parison-based blow-molding method. In this case, an extrusion head is normally used to continuously extrude a plastic parison which can be formed in one or more layers. The plastic parison is introduced in sections into a mold cavity of a blow molding tool, brought into the desired shape by means of a blowing medium introduced at overpressure, and demolded. The blow molding tool usually consists of two blow mold halves, in each of which one half of the mold cavity is formed. The blow mold halves are periodically opened, closed, and opened again in order to introduce a parison section into the mold cavity and, after inflation, to demold the finished container again.

A further, very frequently used production method for plastic containers is stretch blow-molding. In this method, a so-called preform, which usually has a longitudinal, tubular shape, has a bottom at its one longitudinal end and at its other longitudinal end a neck region with shaped threaded sections or the like, is inserted into a mold cavity of a blow molding tool and brought into the desired shape by a blowing medium introduced at overpressure. In this case, the preform is additionally stretched in the axial direction with a stretching mandrel inserted through the neck opening. After the stretching/blow molding process, the finished plastic container is cooled and demolded from the blow mold.

The single-layer or multilayer preform is usually produced in a separate injection-molding method prior to the stretch blow-molding process. It has also already been proposed to produce preforms in a plastic compression-molding method or by an extrusion blow-molding process. Polyethylene terephthalate (PET) and similar materials, such as polyethylene furanoate (PEF), or polyolefins, such as polypropylene (PP), high-density polyethylene (HDPE), or low-density polyethylene (LDPE), are used predominantly as raw material for the production of plastic containers in the stretch blow-molding process. PET has proven itself multiple times and its properties are well-known. In the so-called single-stage stretch blow-molding process, the preform is inserted into the mold cavity of the blow molding tool immediately after its production and inflated and stretched to form a plastic container. In many cases, however, the plastic containers are produced spatially and temporally separately from the stretch blow-molding process in a two-stage method and temporarily stored for later use. During the later stretch blow-molding process, the preforms are first heated again, introduced into the mold cavity of a blow molding tool, stretched in the longitudinal direction with a stretching mandrel, and usually inflated by overpressure to form a plastic container conformant with the mold cavity. In this way, both processes, injection molding and stretch blow-molding, can be run separately and optimally.

Also normally used in the stretch blow-molding process is a blow molding tool which consists of two blow mold halves in each of which a part of the mold cavity is formed. The blow mold halves are periodically opened, closed, and opened again in order to insert, inflate, and stretch the preform and to demold the finished plastic container.

In order that the extruded parison or the heated preform does not suffer any temperature shock during insertion into the mold cavity of the blow molding tool, which could lead to regional freezing of the plastic material and hinder further optimum shaping in the blow molding process, the shaping inner surfaces of the blow molding tool when the extruded parison or the preform is being inserted should have a temperature that does not substantially differ from the temperature of the parison or the preform. That is to say, the temperatures of the inner surfaces of the blow molding tool preferably deviate by no more than 10% from the temperature of the extruded parison or of the preform at the time when the extruded parison or the preform is being inserted. Polyolefins are typically used at a temperature of 180° C. with a deviation of up to 20° K; polyethylene terephthalate is typically used at temperatures of 240° C. to 280° C. with a deviation of up to 20° K. On the other hand, before demolding the plastic container that has been produced, the blow molding tool must be cooled down at the end of the blow molding process to the point that the process of polymerization of the plastic material is largely completed and no undesired deformations can occur during further treatment of the plastic container.

Polyolefins are typically demolded at about 60° C., whereby the temperature at the neck is still about 80° C., and polyethylene terephthalate is typically demolded at about 30° C., whereby the neck and bottom regions possibly have a higher temperature of roughly 60° C. This results in a correspondingly high temperature difference during the blow molding process.

Blow molding tools are usually constructed in a plurality of parts and mostly consist of aluminum or steel or else of non-ferrous metals. The two blow mold halves of a blow molding tool each comprise a molding body, in which at least one mold cavity is formed. The molding body is mounted on a baseplate made of steel, which is a part of the closing unit of the blow molding machine. Due to the pressures occurring during the blow molding process, the baseplates and the molding bodies must be relatively solid. Known from the injection-molding process are molding tools that are very similar in construction but have a significantly more solid design in order to withstand the pressures which occur during injection molding and are many times higher than in blow molding methods.

Considering the relatively good thermal conduction properties of the individual components in blow molding tools, it is immediately apparent that the expenditure for the periodic heating and cooling of the blow molding tools must be very high in order to achieve reasonably acceptable cycle times and be able to produce high-quality products at the same time. It is known that the blow molding tool can be heated or cooled by means of a suitable fluid, for example water, which is circulated under pressure in channels, milled grooves, and holes of the blow molding tool. In order to achieve the shortest possible cycle times, the heating/cooling fluid is conducted through the channels, milled grooves and holes at a relatively high pressure. For the blow molding tool to withstand these high pressures, it must be all the more solid. However, in conjunction with the good thermal conduction properties of the materials used for the blow molding tool, this results in an even higher expenditure for the periodic heating and cooling of the blow molding tool. In addition, the more solid design of the blow molding tool also increases the expenditure required for the periodic opening and closing of the blow mold halves.

In principle, a distinction is to be made between continuous cooling and interval cooling when heating and cooling molding tools, in particular blow molding tools. In the case of continuous cooling, a cooling medium is continuously conducted through the molding tool. In the case of interval cooling, a heated or a cooled fluid is alternately conducted into the molding tool. Both continuous cooling and interval cooling are used in the injection-molding method. In contrast, continuous cooling is used in blow-molding methods.

Due to the lack of economic viability, up to now heating the molds to the preferred temperatures described herein has been dispensed with. The expenditure for dissipating the introduced heat again is enormous and requires a very high cooling capacity. In addition, this prolongs the cycle time since it is necessary to hold demolding until the entire temperature difference has been eliminated.

SUMMARY OF THE INVENTION

The object of the present invention is to design a blow molding tool in such a way that interval cooling can also be used in blow molding methods. A blow molding tool for a blow molding machine is therefore to be modified such that rapid periodic heating and cooling of the blow molding tool is made possible. In this case, the expenditure for the periodic heating and cooling of the blow molding tool is to be decreased.

These objects are achieved by a blow molding tool for a blow molding machine for producing plastic containers in an extrusion or stretch blow-molding process, which has the features listed in the independent claim(s). Developments as well as advantageous and preferred embodiment variants of the invention are the subject-matter of the dependent claims.

The invention proposes a blow molding tool for a blow molding machine, comprising two blow mold halves, each having at least one molding body, in which at least one mold cavity is arranged, and a baseplate receiving the molding body. An insulation block consisting of a thermally insulating material is arranged between the molding body and the baseplate and, optionally, further components of the blow mold halves.

By the molding body equipped with at least one mold cavity being thermally insulated from the baseplate and, optionally, from further components of the blow mold half, the mass to be heated or cooled again is significantly reduced and the heating or cooling is substantially reduced to only the molding body itself. As a result, a very much lower energy expenditure is required for heating or cooling the molding body. Due to the lower mass, the heating and cooling of the molding body can be accomplished in a relatively short time. In conjunction with polished shaping wall surfaces and the short cooling times, the wall surfaces of the mold cavities, which are heated and immediately afterwards cooled again, also permit the production of plastic containers with glossy surfaces.

Polished surfaces are surfaces that have been processed, for example, by means of polishes and a small amount of material has been removed in order to smooth a corresponding surface by removing roughness peaks and, if appropriate, to create gloss at this surface. Surfaces with average roughness values from 0.8 μm are typically referred to as polished surfaces.

The glossiness of surfaces is expressed by means of reflectometers in so-called gloss units (GU). Herein, reference is made to gloss if the glossiness exceeds 10 GUs. The measurement is carried out according to ISO 2813. For completely or partially transparent objects, no reflectometer is used, but the reflectance, i.e., the quotient of reflected to irradiated light, is indicated for a specific angle. In the case of completely or partially transparent plastics, reference is made to gloss when the reflectance exceeds 20%.

The design of the blow molding tool according to the invention makes it possible to achieve such glossy surfaces even with plastics, such as polyolefins, for which it is otherwise not possible, as is known, to achieve such glossy surfaces without additional working steps, such as a multilayer construction of the container, in which the outermost layer, which is supposed to cause gloss, has low viscosity and contains different additives to achieve the low viscosity. With a corresponding design of the wall surfaces of the mold cavities, plastic containers having surfaces structured at least in subregions can also be produced. In this way, with a corresponding design of the wall surfaces, even containers having surfaces that are glossy in subregions and structured in other subregions can be produced.

The term "structured" here means that the surface of the container substantially corresponds to the negative of the molding body, wherein the deviation between the negative and the later surface does not exceed 15%, preferably 10%, and particularly preferably 5%.

The total mass of the blow molding tool constructed from two blow mold halves is limited to that which is absolutely necessary for absorbing the forces occurring during the production process of the plastic container and is substantially composed of the baseplate, the insulation block, and the molding body for each blow mold half. Optionally, a head part and a foot part are added. The decrease in the total mass of the blow molding tool also has an advantageous effect on the energy costs for the movement of the blow mold halves for opening and closing the same. A blow mold designed according to the invention consequently enables precise reproduction of the mold cavity.

An embodiment variant of the blow molding tool can provide that the molding body is embedded in the insulation block. As a result, the molding body is thermally well insulated over a substantial portion of the extent of the at least one mold cavity. Embedding of the molding body prevents the formation of thermal bridges. The dimensions of the molding body and of the insulation block can be selected in such a way that when a head plate or a foot part is used for producing the container neck or the container bottom, they are also thermally insulated from the baseplates of the blow mold halves and any thermal bridges are prevented.

It can be provided that the insulation block is embedded in a molding block. The molding block consists of the baseplate, a bottom, two laterally arranged frame parts, and a neck insert. The frame parts are equipped with guides.

Such a design results in the reduction of individual parts. The production of the blow molding tool is simplified.

It can also be provided that the molding block and the insulation block are formed in one piece.

In other words, each molding tool half is formed only in two parts and is composed of an insulation block which assumes all the functions of the baseplate and of the frame, such as holding and guiding. The manufacture of the blow molding tool is thus simplified.

In a further embodiment variant of the blow molding tool, the molding body is embedded in the insulation block in each blow mold half in such a way that an end face of the molding body which defines a mold parting plane and from which a shaping wall surface delimiting the mold cavity extends in the direction of a rear side of the molding body, is recessed from an upper side of the insulation block in a cold state of the molding body. If the molding body is heated to an operating temperature higher than 100° C., the end face of the molding body will end flush with the upper side of the insulation block or even protrude slightly beyond it. This embodiment variant takes into account the different coefficients of thermal expansion of the materials used and ensures that the mold parting plane is exclusively defined by the end faces of the molding bodies of the blow mold halves. In a variant of the invention, the end face of the molding body is recessed by 0.05 mm to 0.5 mm from the upper side of the insulation block in the cold state of the molding body.

A further embodiment variant of the invention provides that the insulation block consists of a thermosetting, high-temperature-resistant plastic with low thermal conductivity.

This makes a long service life possible and prevents unwanted heat flows.

These plastics are distinguished by their very low thermal conductivity, which is only 0.1-0.8 W/mK depending on the type of plastic. Suitable for use in conjunction with blow molding tools according to the invention are in particular plastics from the group consisting of polyaryl ether ketones, such as polyether ether ketone (PEEK), polyamides, glass-fiber-reinforced plastics, and reinforced thermosets with a temperature resistance of up to at least 200° C. The plastic can in particular be a hard plastic or a hard plastic composite material. Plastics that have a hardness of at least 75 Shore are herein regarded as hard plastics.

This makes precise manufacture possible and also prevents deformations caused by high pressures during operation.

The baseplate of each blow mold half of the blow molding tool is exposed to the greatest stresses, serves to fasten the further components of the blow mold half, and must absorb the closing forces and the compressive forces occurring during the production of the plastic containers. The baseplate is therefore advantageously made of stainless steel.

An embodiment variant of the invention provides that the molding body consists of aluminum. Aluminum has a lower coefficient of thermal expansion than steel and a higher thermal conductivity. Aluminum is therefore a preferred material for the molding body.

In a further embodiment variant of the blow molding tool, the molding body of each blow mold half has a rear side, which is in particular embedded in the insulation block and which is provided with channels, in particular channels that are open on one side, for the throughflow of a heating/cooling medium. The heating/cooling medium flows in the closest possible proximity to the shaping wall surface delimiting the mold cavity. As a result, in particular when the molding body is cooling, the heat of the container wall abutting against the shaping wall surface can be dissipated very well. In contrast to, for example, injection molding, the heat can only be dissipated on one side via the cooled shaping wall surface of the molding body during blow molding. It is therefore recommended to keep the distance of the heating/cooling medium from the shaping wall surface as short as possible.

In this embodiment variant, the channels are closed by embedding in the insulation block so that a cooling circuit is formed. Prior to embedding, these channels are therefore open and accessible at one end.

The formation of such channels on the molding body makes it possible to form the channels freely in the mold, for example, whereby, in particular, curved shapes are possible or flow cross-sections that deviate from a round shape. Such designs are not possible, for example, in conventional molding bodies since no change in direction is possible in cooling holes.

The rear side of the molding body preferably has ribs, between which, in particular by which, the channels are formed. The ribs are preferably arranged alternately and extend from a first longitudinal side of the mold, on which the parting plane is formed, in the direction of a second longitudinal side of the mold but only to the extent that an opening is formed between the rib and the respective second longitudinal side, said opening having a cross-section corresponding to the cross-section of the channels. In this way, a contiguous meandering channel that extends across the rear wall of the molding body is formed.

The ribs have a minimum wall thickness of 3 mm and do not exceed a wall thickness of preferably 8 mm.

When the heating/cooling medium is introduced, the heat can be supplied very quickly to the mold half or dissipated therefrom by these ribs.

An embodiment variant of the invention therefore provides that the molding body has a minimum wall thickness of 1.5 mm to 12 mm in the region of the mold cavity. The minimum wall thickness relates to the region in the cooling channels or in the channel base from the channel base to the surface of the mold cavity. This wall thickness preferably does not exceed a thickness of 6 mm and is preferably less than 4 mm.

This enables the molding body to be rapidly heated or cooled.

In one embodiment variant of the invention, the channels are produced on the rear side of the molding body by casting or by machining. Casting has the advantage that a further processing step for the molding body is dispensed with. However, the channels may also be produced by alternative manufacturing methods, for example generative manufacturing methods, such as fiber melting or metal printing. In such methods, details can be elaborated even better, for example.

By arranging the molding body at or on the insulation block, a closed cooling or heating circuit which is sealed off from its surroundings and has only devices for supplying and discharging the heating/cooling medium is preferably formed.

The heating/cooling channels, in particular the heating/cooling circuit, are thus preferably delimited by the insulation block on the one hand and by the molding body on the other hand.

In this case, it can additionally be provided that corresponding ribs and/or channels are appropriately arranged in the insulation block so that the ribs and channels of the molding body are each arranged on the ribs and channels of the insulation block and together form a heating/cooling cross-section.

The cross-sections of the heating/cooling cross-sections can be adapted easily. With a given cross-section, it is also possible to produce the respective ribs on the molding body and on the insulation block at half the height in each case. This facilitates manufacture.

The insulation block expediently serves not only to thermally insulate the molding body from the baseplate. In a further embodiment variant, the insulation block is therefore equipped with channels and/or holes for the supply and discharge of a heating/cooling medium to the channels formed on the rear side of the molding body. An embodiment variant of the invention can provide that all connections for the supply and discharge of hot and cold media are provided on the insulation block. The connections then have no thermal contact with the baseplate or other components of the tool, for example.

Depending on the size of the at least one mold cavity in the molding body, two or more separate heating/cooling circuits can be provided in the insulation block and on the rear side of the molding body. The provision of a plurality of heating/cooling circuits permits a faster introduction or displacement of the heating/cooling medium in order to heat or re-cool the molding part. The pressure of the heating/cooling medium is advantageously up to 15 bar, but the pressure can also be above 20 bar and up to 25 bar. In connection with a plurality of heating/cooling circuits, a very rapid heating or cooling is thereby made possible, which has an advantageous effect on the cycle times. Water is normally used as heating/cooling medium for the molding body.

A further embodiment variant of the blow molding tool according to the invention can provide that two or more molding bodies are mounted on the baseplate of each blow mold half. In this case, each molding body can be thermally insulated from the baseplate and the remaining components of the blow mold half by a separate insulation block, or the molding bodies can be thermally insulated from the baseplate and the remaining components of the blow mold half by a common insulation block.

The blow molding tool according to the invention can be designed for use in an extrusion blow-molding machine or in a stretch blow-molding machine. Extrusion blow-molding machines or stretch blow-molding machines with a blow molding tool designed according to the invention are characterized by a reduced energy expenditure for heating or cooling the molding bodies. The cycle times can thereby be reduced. Due to the usually also reduced total mass, the energy expenditure for the movement of the blow mold halves for the periodic opening and closing of the blow molding tool is also reduced.

A method for producing a plastic container with a blow molding tool as described herein in accordance with one of the embodiments of the invention has the following method steps:
a) heating a molding body by supplying a heating medium,
b) introducing a preform or an extruded parison into the molding body,
c) closing the blow molding tool,
d) shaping the plastic container by inflating the preform or the extruded parison and by abutting the preform or the extruded parison against the wall surfaces of the molding body,
e) cooling the molding body by supplying a cooling medium,
f) opening the blow molding tool,
g) ejecting the plastic container.

The method steps substantially correspond to those of blow molding methods with conventionally designed blow molding tools known from the prior art. In contrast to the known blow molding methods, cooling of the molding body takes place by means of interval cooling. In this case, the shaping wall surfaces of the molding body are alternately supplied in a very short time with a correspondingly temperature-controlled heating or cooling medium. The molding body is preferably cooled in such a way that it has an average cooling rate of at least 5 kelvin per second, preferably 15 kelvin per second, and particularly preferably 30 kelvin per second.

A special method procedure for producing a plastic container is characterized in that during the above-mentioned method steps d) and e), the surface regions that are in contact with polished wall surfaces of the molding body form a glossy surface on the plastic container.

Another method variant is characterized in that during steps d) and e), the surface regions that are in contact with structured wall surfaces of the molding body form a structured surface on the plastic container.

The method according to the invention can be carried out in a particularly simple and cost-effective manner if correspondingly temperature-controlled water is used as heating medium and as cooling medium, said water being supplied at correspondingly high pressures into heating or cooling channels on a rear side of the molding body.

In a further method variant, a preform or an extruded parison, substantially comprising a polyolefin, is inserted into the blow molding tool. The extruded parison or the preform preferably consists substantially of a polyolefin. In other words, the preform or the extruded parison has less than 2% of foreign substances and is in particular homogeneous. During the production of the plastic container, the heating medium is supplied at a temperature of 120° C. to 200° C., preferably 160° C., and the cooling medium is supplied at a temperature of 5 to 40° C., preferably 15° C. In conjunction with polished shaping wall surfaces of the molding body and/or wall surfaces of the molding body provided with structures, containers with glossy and/or structured surfaces can be produced very easily and reproducibly in this way, even in the case of such plastics.

A further method variant for the production of a plastic container is characterized in that, for example, the cycle time with an all-over cooled blow mold for the production of a plastic container with a filling volume of 200 ml is merely 10 to 15 seconds, preferably 12 seconds. These cycle times permit a cost-effective mass production of plastic containers of the specified filling volume.

BRIEF DESCRIPTION OF THE DRAWINGS

Further advantages and embodiment variants of the invention will be apparent from the following description of exemplary embodiments with reference to the schematic drawings. The drawings show, in a representation not true to scale.

For the sake of better understanding, identical parts and components of the blow molding tool bear the same reference signs in the individual figures.

DETAILED DESCRIPTION OF THE PREFERRED EMBODIMENTS

Figure 1:
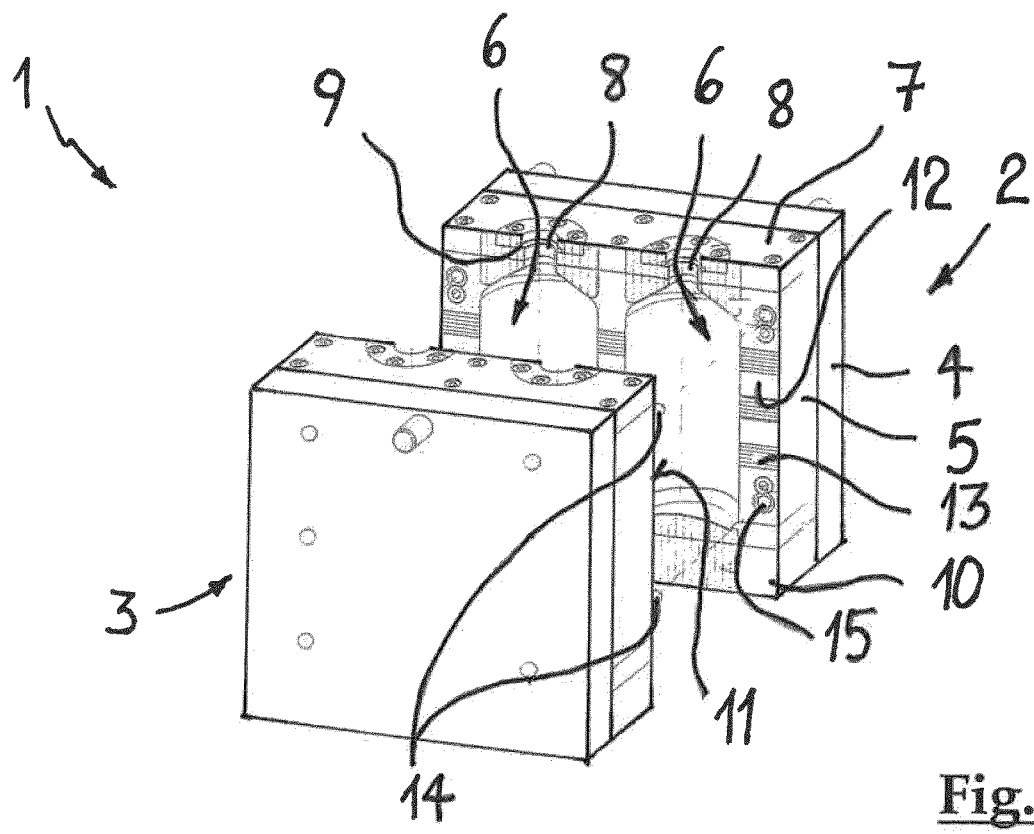
FIG. 1 a prior-art blow molding tool having two blow mold halves.

With reference to a blow molding tool of the prior art, FIG. 1 shows the basic structure of such a tool. The blow molding tool, which is as a whole provided with reference sign 1, consists of two blow mold halves 2, 3, which are laterally displaceable relative to one another in order to open and close the blow molding tool 1 periodically. Each blow mold half comprises a baseplate 4, which forms a part of a closing unit of a blow molding machine. Mounted on the baseplate 4 is a molding body 5 in which one or more mold cavities 6 are formed. According to the exemplary embodiment shown, the molding body 5 has two mold cavities, each defining one half of the shape of a body of a plastic container. A head plate 7 is equipped with a cavity 8 for defining a neck section of the plastic container. In the case of a blow molding tool for an extrusion blow-molding machine, a neck blade 9 for separating an extruded plastic parison inserted into the blow molding tool 1 can also be provided on the head plate 7. A bottom part 10 closes the mold cavities 6 at the other end of the blow molding tool 1. Venting slots 13 can be formed on the mutually facing surfaces 11, 12 of the blow mold halves 2, 3, which define a parting plane of the blow molding tool 1. On one of the blow mold halves 3, guide pins 14 are formed, which slide into guide bushes 15 of the other blow mold half 2 when the blow mold halves 2, 3 are closed.

Figure 2:
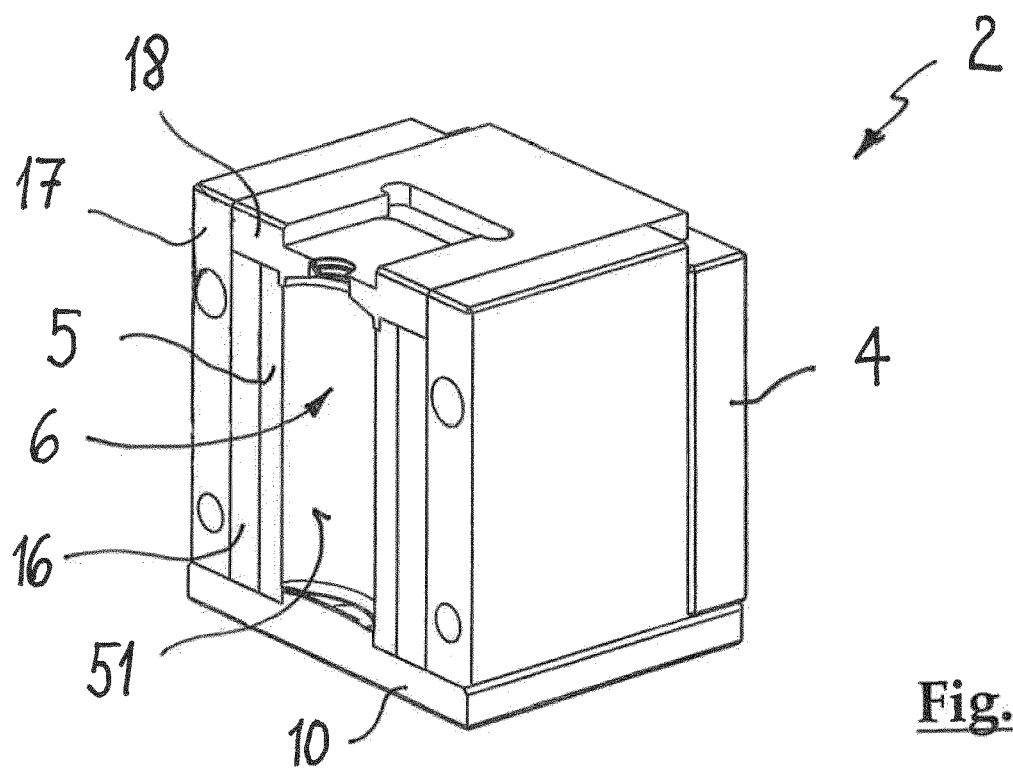
FIG. 2 a perspective view of a blow mold half of a blow molding tool according to the invention.

A blow mold half of a blow molding tool designed according to the invention is as a whole provided with reference sign 2 in FIG. 2. It goes without saying that the second blow mold half, not shown in FIG. 2, is formed correspondingly to the first blow mold half 2. The blow mold half 2 in turn comprises a baseplate 4 and a molding body 5, in which a mold cavity 6 is formed. The mold cavity 6 defining half the shape of a container body is delimited by a shaping wall surface 51. In contrast to the blow mold half shown in FIG. 1, the molding body 5 is embedded in an insulation block 16. The insulation block 16 consists of a thermally insulating plastic or plastic composite material and thermally insulates the molding body 5 from the baseplate 4, a frame 17 fastened thereto, a neck insert 18 which corresponds to the head plate 7 in FIG. 1, and the bottom part 10. The insulation block 16 prevents thermal bridges between the molding body 5 and the surrounding parts of the blow molding tool. According to the exemplary embodiment shown, the neck insert 18 is formed as a separate part which is brought into position when the blow mold halves are closed and lifted off again when they are opened. However, the neck insert 18 may also be fixedly connected to the frame 17. It should also be noted that, for reasons of clarity, FIG. 2 dispenses with the illustration of screw connections, guide pins, or guide bushes, and the like.

Figure 3:
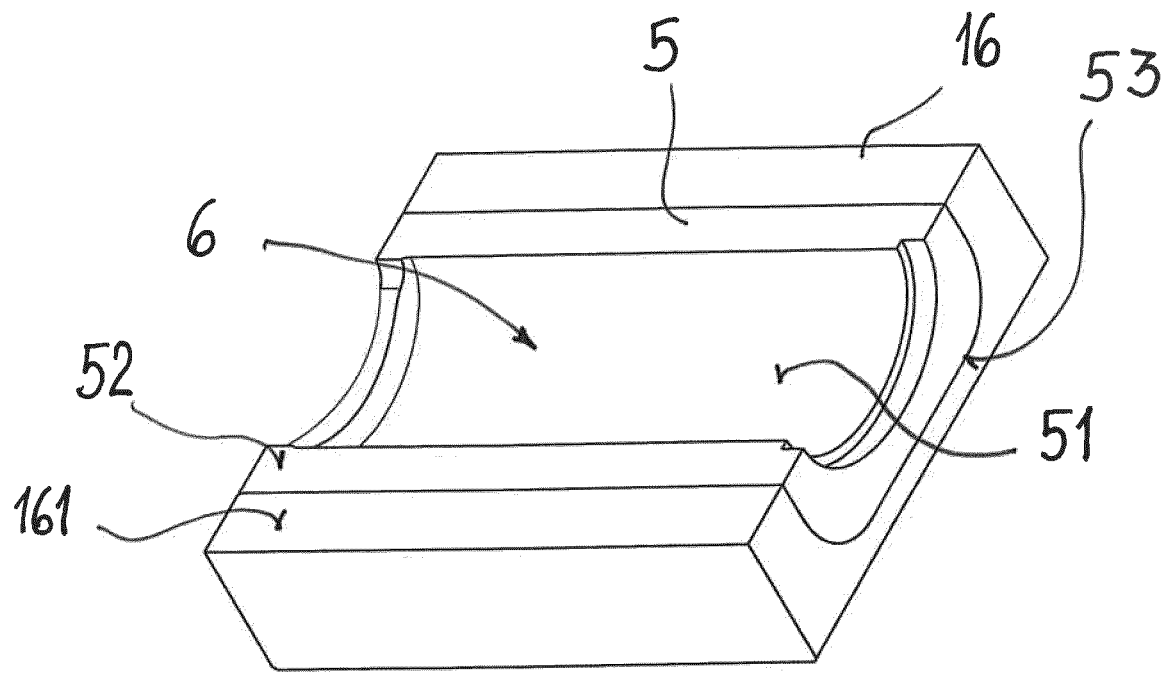
FIG. 3 a perspective view of a molding body embedded in an insulation block.

FIG. 3 shows an exemplary embodiment of a molding body 5 embedded in an insulation block 16. The mold cavity in turn bears reference sign 6. The wall surface delimiting the mold cavity 6 is provided with reference sign 51. The mold cavity 6 defines, for example, half of the shape of a container body. The wall surface 51 may be polished, for example. The molding body 5 is completely embedded in the insulation block 16 in order to ensure that no undesired thermal bridges to the baseplate 4 can occur. The molding body 5 is dimensioned, for example, in such a way that space remains in the insulation block 16 for a head plate or for a foot part for the production of the container neck or of the container bottom. In this way, the head plate or the foot part (not shown in each case) is also thermally insulated from the baseplate and the frame of the blow mold half, and any thermal bridges can be prevented.

An end face 52 of the molding body 5 which defines a mold parting plane and from which the shaping wall surface 51 delimiting the mold cavity 6 extends in the direction of the baseplate, is recessed from an upper side 161 of the insulation block 16 in a cold state of the molding body 5. If the molding body 5 is heated to an operating temperature higher than 100° C., the end face 52 of the molding body 5 will end flush with the upper side 161 of the insulation block 16 or can even protrude slightly beyond it. In the cold state, the end face 52 of the molding body 5 is recessed from the upper side 161 of the insulation block 16 by a distance of about 0.05 mm to 0.5 mm. Due to the very short distance, this recess cannot be seen in the representation in FIG. 3. The shaping wall surface 51 has a shortest possible distance from a rear side 53 of the molding body 5. In other words, the molding body 5 has a minimum wall thickness of about 1.5 mm to 12 mm in the region of the mold cavity 6.

Figure 4:
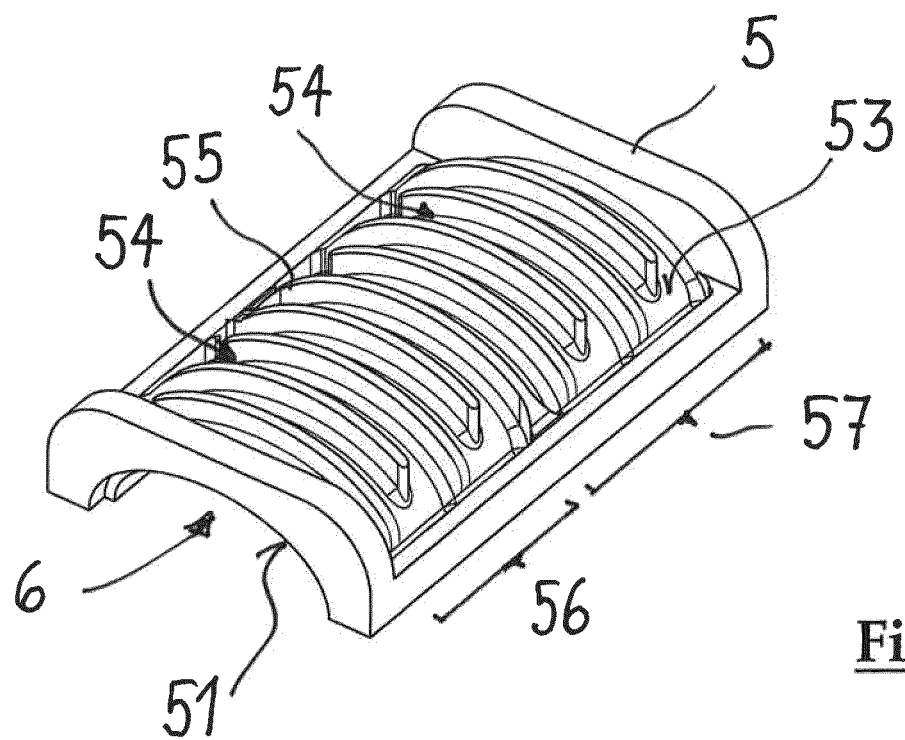
FIG. 4 a perspective view of the rear side of the molding body of FIG. 3.

FIG. 4 shows a perspective view of the rear side 53 of the molding body 5 of FIG. 3. In the side of the molding body 5 facing away from the viewer, the mold cavity 6 is formed. The rear side 53 of the molding body 5 is provided with channels 54 for the flow of a heating/cooling medium, for example water. The channels 54 can be produced by machining, for example milling and drilling, of the molding body 5. They are delimited from one another by ribs. In an alternative embodiment variant, the channels can be produced during casting of the molding body or by alternative manufacturing methods, for example laser melting or metal printing. The rear side 53 of the molding body 5 with the channels 54 is embedded in the insulation block in the assembled state of the blow molding tool (FIG. 3). The insulation block serves not only to thermally insulate the molding body 5 from the remaining components of the blow mold half. Rather, the insulation block is also equipped with channels and/or holes for the supply and discharge of the heating/cooling medium to the channels formed on the rear side of the molding body. It may be provided that all connections for the supply and discharge of hot and cold media are provided on the insulation block. The connections will then have no thermal contact with the baseplate or other components of the blow molding tool, for example.

Depending on the size of the mold cavity 6 in the molding body 5, two or more separate heating/cooling circuits can also be provided on the rear side 52 of the molding body 5. In the exemplary embodiment illustrated, a partition 55 divides the channels 54 into two heating/cooling circuits 56, 57. The individual heating/cooling circuits are formed as a meandering arrangement of channels. The provision of a plurality of heating/cooling circuits 56, 57 permits a faster introduction or displacement of the heating/cooling medium in order to heat or re-cool the molding part. The pressure of the heating/cooling medium is advantageously up to 15 bar. In connection with a plurality of heating/cooling circuits 56, 57, a very rapid heating or cooling of the molding body 5 is thereby made possible, which has an advantageous effect on the cycle times. Water is usually used as heating/cooling medium for the molding body 5. The heating/cooling medium flows in the closest possible proximity to the shaping wall surface 51 delimiting the mold cavity 6. As a result, in particular when the molding body 5 is being cooled, the heat of the container wall abutting against the shaping wall surface 51 can be dissipated very well. The dissipation of the heat is additionally improved by the ribs forming the channels. In contrast to, for example, injection molding, the heat can only be dissipated on one side via the cooled shaping wall surface of the molding body during blow molding.

The foregoing description of the figures is limited to the details required to understand the invention. However, it goes without saying that the blow molding tool has all the components required for its function. For example, locking elements are provided for the blow mold halves and for the optionally present head and foot parts so that the blow molding tool remains closed at the internal pressures occurring during the blow molding process. The blow molding tool is also provided with a wide variety of connections, for example in order to connect it to a supply with a cooling/heating medium.

The invention has been described with reference to specific exemplary embodiments. However, the foregoing description only serves to illustrate the invention and is not to be taken in a limiting sense. Rather, the invention is defined by the claims and the equivalents encompassed by the general inventive concept and revealed to those skilled in the art.

The invention claimed is:

1. A blow molding tool for a blow molding machine, comprising:
    two blow mold halves, each having at least one molding body in which at least one mold cavity is arranged, and
    a baseplate receiving the molding body,
    wherein an insulation block made of a thermally insulating material is arranged between the molding body and the baseplate such that the molding body is thermally insulated from the baseplate,
    the molding body has a rear side provided with channels providing heating/cooling circuits for a flow of a heating/cooling medium,
    the heating/cooling circuits are formed by the same channels in the insulation block and on the rear side of the molding body, wherein supply and discharge of the correspondingly temperature-controlled heating/cooling medium can be controlled by means of valves in such a way that the heating medium or the cooling medium can be introduced alternately into the channels.

2. The blow molding tool according to claim 1, wherein the molding body is embedded in the insulation block.

3. The blow molding tool according to claim 2, wherein the insulation block is embedded in a molding block consisting of the baseplate, a bottom, two laterally arranged frame parts, and a neck insert, and the frame parts are equipped with guides.

4. The blow molding tool according to claim 3, wherein the molding block and the insulation block are formed as one piece.

5. The blow molding tool according to claim 2, wherein the molding body is embedded in the insulation block in such a way that an end face of the molding body, which defines a mold parting plane and from which a shaping wall surface delimiting the at least one mold cavity extends in the direction of a rear side of the molding body, is recessed from an upper side of the insulation block in a cold state of the molding body, while the end face of the molding body ends flush with the upper side of the insulation block or protrudes slightly beyond the upper side of the insulation block when the molding body is heated to the operating temperature.

6. The blow molding tool according to claim 5, wherein in the cold state of the molding body, the end face of the molding body is recessed from the upper side of the insulation block by 0.002 inches to 0.020 inches (0.05 mm to 0.5 mm).

7. The blow molding tool according to claim 1, wherein the insulation block consists of a thermosetting, high-temperature-resistant plastic with low thermal conductivity.

8. The blow molding tool according to claim 7, wherein the insulation block comprises a plastic from the group consisting of polyaryl ether ketones, polyamides, glass-fiber-reinforced plastics, and reinforced thermosets with a temperature resistance of up to at least 392° F. (200° C.).

9. The blow molding tool according to claim 1, wherein the baseplate is made of stainless steel.

10. The blow molding tool according to claim 1, wherein the molding body is made of aluminum.

11. The blow molding tool according to claim 1, wherein the molding body has a rear side embedded in the insulation block.

12. The blow molding tool according to claim 11, wherein the channels are produced on the rear side of the molding body by casting, by machining, or by alternative manufacturing methods, such as fiber melting or metal printing.

13. The blow molding tool according to claim 11, wherein the molding body has a minimum wall thickness of 0.059 inches to 0.472 inches (1.5 mm to 12 mm) measured in a region of the at least one mold cavity.

14. The blow molding tool according to claim 11, wherein the insulation block is equipped with connections, channels and/or holes for supply and discharge of a heating/cooling medium to the channels formed on the rear side of the molding body.

15. The blow molding tool according to claim 14, wherein two or more separate heating/cooling circuits are provided in the insulation block and on the rear side of the molding body.

16. The blow molding tool according to claim 1, wherein two or more molding bodies are mounted on the baseplate, and each molding body is thermally insulated from the baseplate by an insulation block.

17. The blow molding tool according to claim 1, wherein two or more molding bodies are mounted on the baseplate, and the molding bodies are thermally insulated from the baseplate by a common insulation block.

18. The blow molding tool according to claim 1, wherein the blow molding tool is designed for use in an extrusion blow-molding machine.

19. The blow molding tool according to claim 1, wherein the blow molding tool is designed for use in a stretch blow-molding machine.

20. An extrusion blow-molding machine comprising a blow molding tool according to claim 1.

21. A stretch blow-molding machine comprising a blow molding tool according to claim 1.

22. A method for producing a plastic container with a blow molding tool according to claim 1, characterized by the following method steps:
    a) providing the blow molding tool,
    b) heating the molding body by supplying a heating medium,
    c) introducing a preform or an extruded parison into the molding body,
    d) closing the blow molding tool, e) shaping the plastic container by inflating the preform or the extruded parison and by abutting the preform or the extruded parison against wall surfaces of the molding body, f) cooling the molding body by supplying a cooling medium, g) opening the blow molding tool, and h) ejecting the plastic container.

23. The method for producing a plastic container according to claim 22, wherein during steps e) and f), the surface regions that are in contact with polished wall surfaces of the molding body form a glossy surface on the plastic container.

24. The method for producing a plastic container according to claim 22, wherein during steps e) and f), the surface regions that are in contact with structured wall surfaces of the molding body form a structured surface on the plastic container.

25. The method for producing a plastic container according to claim 22, wherein correspondingly temperature-controlled water is used as the heating medium and as the cooling medium.

26. The method for producing a plastic container according to claim 22, wherein a preform or an extruded parison substantially comprising a polyolefin is inserted into the blow molding tool, the heating medium is supplied at a temperature of 248° F. to 392° F. (120° C. to 200° C.) and the cooling medium is supplied at a temperature of 41° F. to 104° F. (5 to 40° C.).

27. The method for producing a plastic container according to claim 22, wherein the cycle time for the production of a plastic container with a filling volume of 6.762 ounces (200 ml) is 10 to 15 seconds.

* * * * *